United States Patent
Wolfsried

[11] Patent Number: 5,570,937
[45] Date of Patent: Nov. 5, 1996

[54] METHOD FOR ENSURING VEHICLE BRAKING UNDER WET CONDITIONS

[75] Inventor: Stephan Wolfsried, Waiblingen, Germany

[73] Assignee: Mercedes-Benz AG, Germany

[21] Appl. No.: 509,805

[22] Filed: Aug. 1, 1995

[30] Foreign Application Priority Data

Aug. 1, 1994 [DE] Germany .................. 44 27 170.0

[51] Int. Cl.⁶ .................. B60T 8/00; B60T 8/48; B60T 8/60; B60T 17/22
[52] U.S. Cl. .................. 303/191; 188/1.11; 303/145
[58] Field of Search .................. 303/191, 113.3, 303/113.2, 1, 89, 2, 3, 15–20, 125, 145; 180/197, 169–179; 188/151 A, 1.11; 364/426.01, 426.02, 426.03; 91/376 R

[56] References Cited

U.S. PATENT DOCUMENTS

| | | |
|---|---|---|
| 4,498,711 | 2/1985 | Langley et al. |
| 4,790,606 | 12/1988 | Reihecke .................. 303/191 |
| 4,871,215 | 10/1989 | Takayama .................. 303/191 |
| 5,176,065 | 1/1993 | Castel et al. .................. 91/376 R |
| 5,278,764 | 1/1994 | Iizuka et al. .................. 303/191 X |
| 5,332,296 | 7/1994 | Morita et al. .................. 303/125 |
| 5,427,441 | 6/1995 | Otsu .................. 303/191 X |
| 5,445,444 | 8/1995 | Rump et al. .................. 303/125 |
| 5,447,363 | 9/1995 | Fukamachi .................. 303/125 |

FOREIGN PATENT DOCUMENTS

| | | |
|---|---|---|
| 0486340B1 | 5/1992 | European Pat. Off. |
| 4101759A1 | 8/1991 | Germany. |
| 4329139C1 | 7/1994 | Germany. |

Primary Examiner—Douglas C. Butler
Attorney, Agent, or Firm—Evenson, McKeown, Edwards & Lenahan P.L.L.C.

[57] ABSTRACT

A method ensures that, even under wet conditions, the unrestricted intended braking effect is always achieved on wheels of a vehicle brake system. At the same time, the service life of the brake system is not to be influenced appreciably. When a sensor device detects that wet conditions influencing the braking effect are present and it has been detected that the braking effect of a brake could be impaired, a temporary braking operation is carried out on at least that particular brake, in such a way that the deceleration of the vehicle cannot be perceived by the driver.

33 Claims, 2 Drawing Sheets

METHOD FOR ENSURING VEHICLE
BRAKING UNDER WET CONDITIONS

BACKGROUND AND SUMMARY OF THE INVENTION

The present invention relates to a method for ensuring the braking effect of brakes of vehicles under wet conditions.

Travelling for relatively long periods without braking and wet conditions as a result of rain and/or plumes of spray from vehicles in front may lead to a delayed response of brakes or to steering reactions or offsets of vehicles, depending on whether the braking effects on the two sides of a vehicle axle are symmetrical or asymmetric. This is based on the fact that, when the brakes are actuated, water first evaporates between the brake lining and brake disc. The brake achieves its unrestricted intended effect only when this water has evaporated completely.

In order to guarantee a good response of brakes even under wet conditions, flow-off channels for the water have been provided either on the brake lining or on the brake disc or brake drum. For this purpose, for example, grooves are made on the brake linings. After even only a short time, however, these grooves become clogged with abrasive particles, so that their effect is no longer guaranteed. Particularly in the case of motor cycles, it is therefore customary to use perforated brake discs. However, the service life of such perforated brake discs is shorter than that of comparable non-perforated brake discs. Moreover, perforated brake discs also lead to an increased wear of the brake linings.

Furthermore, DE 4,101,759 5 A1 describes the use of the actuation of the screen wipers as a sensor device for wet conditions. By way of a signal from this sensor device, the brake-actuation of a headway control system is adapted to the wet road state in which there is reduced adhesion between the wheel and roadway. EP 0,486,340 B1 describes an arrangement which makes it possible to generate brake pressure via a brake booster but without causing a movement of the brake pedal. A brake system having the necessary devices for generating a brake pressure, without an actuation of the brake pedal, is also described in D 4,329,139 C1.

An object of the present invention is to ensure that, even under wet conditions, the unrestricted intended braking effect is always achieved on wheels of a vehicle brake system. At the same time, the service life of the brake system is not to be appreciably influenced.

The foregoing object has been achieved in that, when a sensor device detects that wet conditions influencing the braking effect are present and, if it has been found that the braking effect of a brake could be impaired by correspondingly long travelling without braking, a temporary braking operation is carried out such that the deceleration of the vehicle is not perceived by the driver.

As a result of the actuation of the brake, the water precipitated on the brake evaporates. The immediate full operating capacity of the brake is thereby ensured until a specific quantity of water has been precipitated on the brake disc again. When this is so, a braking operation once again takes place.

According to one embodiment of the invention, the screen-wiper switch is used as a sensor device. The screen-wiper switch is a particularly simple and cost-effective sensor device because it is present in any event in the vehicle. In the simplest version, a distinction is made only between the states "screen wiper inoperative" and "screen wiper operative". In another version, there can then also be a distinction between the individual operating modes of the screen wiper (for example, interval control, slow and fast wiping speed) and, at the same time, the frequency and/or intensity or duration of the braking operation can be influenced.

According to further embodiments of the invention, the vehicle deceleration occurring as a result of this braking operation can be determined or estimated. The drive torque generated by the engine can be regulated or determined via a regulating device so that, during this braking operation, no actual vehicle deceleration resulting from the automatic braking operation occurs. The vehicle deceleration taking place on account of the braking operation can thus be compensated. Action on the vehicle brake system remains concealed from the driver. Even without an active compensation of the braking effect via the drive, a deceleration sufficient for the intended function of the method can scarcely be perceived by most drivers.

In order to ensure the directional stability of the vehicle, it is advantageous to carry out the braking operation on the front axle only. Where passenger cars are concerned, in particular, it is necessary to carry out the braking operation on the front axle on account of the higher load caused by rain, splashes of water and water spray. The braking operation on the rear axle can be dispensed with.

By use of the term "brakes" it is understood to include all types of vehicle brakes in which the braking effect is generated by friction between a brake lining and a braking surface. Since brake discs are particularly exposed to the wet and are not as well protected or closed off as drum brakes, use of the method of the present invention in disc brakes particularly is advantageous.

A further appropriate alternative is to record the temperature of the brake disc or brake drum and to carry out the braking operation when the brake-disc temperature falls below a temperature limit value. The brake-disc temperature does not necessarily have to be measured, but, for example, it can also be determined computationally, inasmuch as the heat generated as a result of all the braking operations and the heat transmitted into the environment by the discs are continuously computed and summed up.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
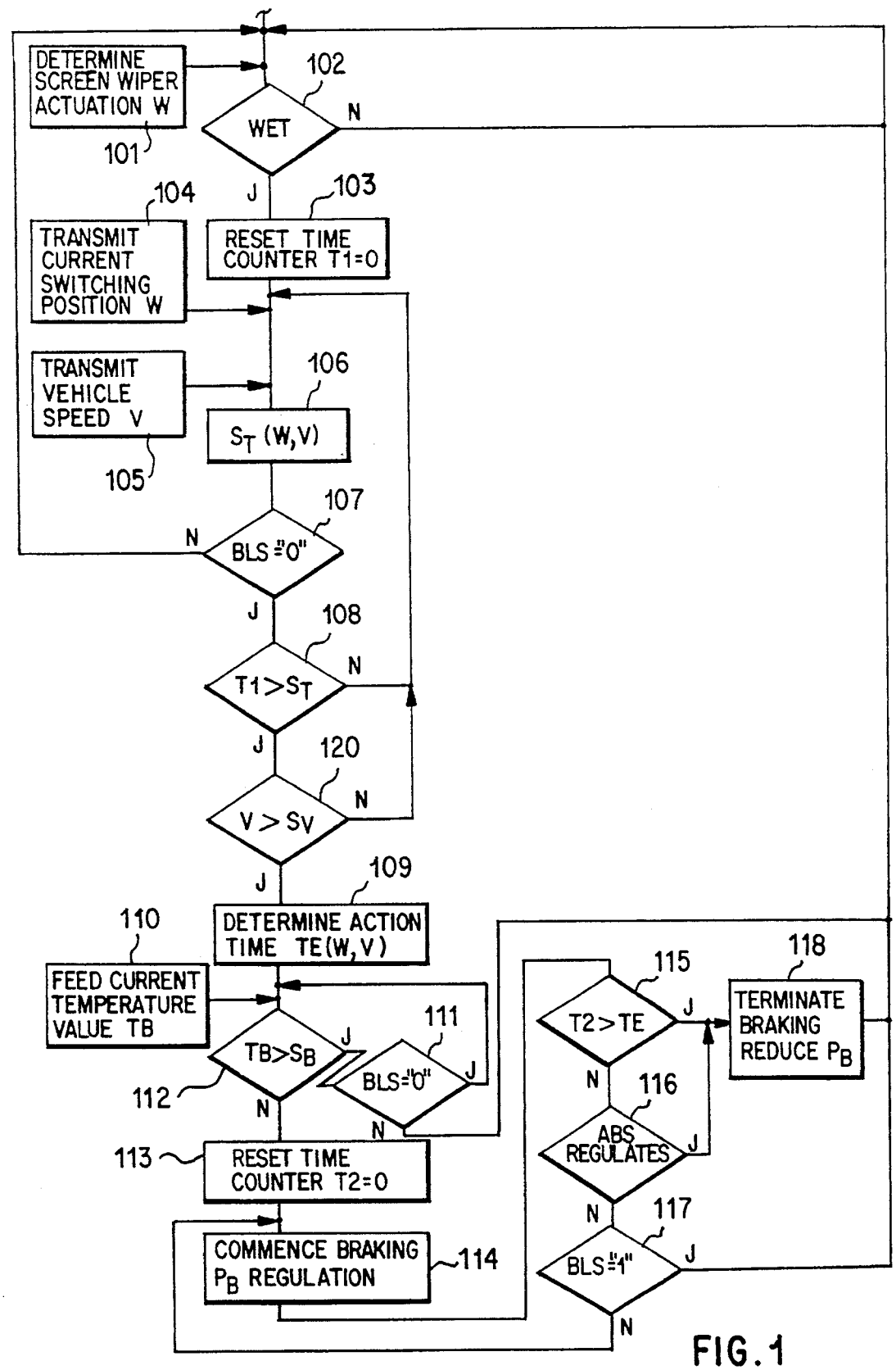
FIG. 1 is a flow diagram of a method according to the present invention.

Referring now to FIG. 1, the actuation of the screen wiper is determined in Step 101 and is fed as a signal to the control. In the simplest version, for this purpose the switching position W of the screen-wiper switch can be recorded. Depending on the switching position determined, the presence of a wet condition is then concluded in Step 102. The presence of the wet condition is concluded when the screen-wiper switch is in the position W which corresponds to a continuous operation of the screen wiper. Operation by interval control can also be considered as a continuous operation of the screen wiper.

In Steps 103 to 108, the compliance with a time free of brake actuation is recorded before the start of a braking operation. For this purpose, in Step 103, the time counter for the time T1 free of brake actuation is reset. In Step 104, the current switching position W is transmitted to the control, and according to Step 105, the vehicle speed is transmitted to the control. In dependence on these two parameters, the time-threshold value $S_T$ is determined in Step 106. Thus, for example, at a high vehicle speed the time-threshold value $S_T$ can be selected lower than at lower vehicle speeds.

If the sensor device is so configured, a distinction can be made between the different switching positions W of the screen-wiper switch. At a fast wiping speed, i.e. a high wiping frequency, a lower time-threshold value $S_T$ can be used than at a lower wiping speed. Since, as a rule, a higher wiping speed of the screen wiper is necessary at a high driving speed, these two influencing variables are superposed. It is, therefore, particularly advantageous to determine the time-threshold value by a characteristic diagram ascertained as suitable by way of road tests.

In Step 107, a check is made by the operating signal of the stop-light switch BLS as to whether the brake is actuated. As soon as the brake is actuated, the method is terminated and jumps back to the start. This, on one hand, ensures that a braking operation which is automatically taking place has no influence on a manual brake actuation by the driver. On the other hand, the method prevents the braking operation from being carried out with unnecessary frequency. The time-threshold value $S_T$ can preferably assume values of between 2 and 10 minutes.

Subsequently, a check is made in Step 108 as to whether the time T1 free of brake actuation has exceeded the time-threshold value $S_T$. If this is not so, there is a jump back to Step 104. A new determination of the time-threshold value $S_T$ thus takes place continuously. If a new time-threshold value $S_T$ is not to be determined continuously, then, instead of the jump back to Step 104, there can be a jump back to Step 107. The determination of the time-threshold value then takes place only once.

Step 108 detects that the time-threshold value $S_T$ is exceeded, then, in Step 120, a check is made as to whether the current driving speed V, which is known from Step 105, exceeds a speed-threshold value $S_v$. If this is not so, there is a jump back to Step 104. The speed threshold serves for restricting the braking operation to necessary situations. At speeds below a speed threshold $S_v$ of, for example, 80 to 100 km/h, as a rule only a little water infiltrates onto the brake. A braking operation is therefore expedient only when the driving speed V is above the speed-threshold value $S_v$. The speed-threshold value $S_v$ is preferably determined for each vehicle type in a road test.

If, in contrast, it is detected in Step 120 that the speed-threshold value $S_v$ is exceeded, then the action time $T_E$ is determined in Step 109. For this purpose, once again, the switching position W of the screen-wiper switch and the vehicle speed V are used as parameters. The actuating time is preferably determined at an interval of 10 to 30 seconds. The action time $T_E$ will become shorter at a higher driving speed, whereas the action time $T_E$ becomes longer at a higher wiping speed.

Steps 110 to 112 comprise a temperature monitoring. These steps are optional and serve only for minimizing the number of braking operations. Moreover, Steps 110 to 112 can also replace Steps 103, 106 to 108. Steps 103, 106 to 108 constitute a delaying time element and monitor a period free of brake actuation before a braking operation. This period free of brake actuation is then obtained in Steps 110 to 112 by the thermal inertia of the brake. It is advantageous, at the same time, if a braking operation takes place only when the liquid or moisture is no longer evaporating on the surfaces because the temperature of the brake has fallen too far. A disadvantage to be noted in this case is that a relatively exact recording of the brake temperature is necessary. Although this temperature can be recorded by measurement or by a continuous computation of the energy balance of the brake, this is nevertheless at all events more complicated than the time element.

Moreover, when the temperature of the brake is recorded, this temperature can also be used as a criterion for terminating the braking operation. As a result, under wet conditions, the braking operation then takes place in a way such that the temperature is always maintained within a particular temperature band. The temperature band has a lower limit of values between approximately 60° and 100° C. by the evaporation of the water on the brake. The temperature has an upper limit based on the fact that no overheating occurs during normal operation even after several successive vigorous brakings. It, therefore, is expedient to limit the temperature band at the top to temperatures of between 150° and 200° C.

In Step 110, a value for the current temperature TB of the brake is fed to the control. This value can be determined, for example, by measurement. Subsequently, in Step 112, a check is made as to whether a temperature-threshold value $S_B$ is exceeded. If the temperature-threshold value $S_B$ is exceeded, then a check is made in Step 111 as to whether the driver has actuated the brake pedal. This is monitored, for example, via the signal of the stop-light switch BLS. As long as the stop-light switch BLS is not switched, (a switching signal "0"), there is the jump back to Step 110 and a new value for the brake temperature is determined. Otherwise, there is a jump to Step 101.

In contrast, if it is detected in Step 112 that the current value of the brake temperature TB has fallen short of the temperature-threshold value $S_B$, then, in Step 113, the time counter T2 for the action time is reset. The braking operation commences according to Step 114. For this purpose, the brake pressure in brakes is regulated. This can involve the introduction of a predetermined fixed brake-pressure value. This brake-pressure value is then to be determined in such a way that the deceleration resulting from it is not perceived by the driver. This is the case at pressure values between 3 and 10 bar, but particularly between 3 and 5 bar. Alternatively, the vehicle deceleration can also be measured or be derived from measured variables, for example the wheel speeds, and the brake pressure can then be regulated in such a way that this deceleration remains within a specific deceleration band. Decelerations of a vehicle in the direction of travel which are not perceived by the driver are in the range of between 0.03 and 0.05 g, with "g" representing the acceleration due to gravity.

The present invention also contemplates the generation of brake pressure on only individual brakes. For reasons of driving stability, however, it is preferable to carry out the braking operation simultaneously on both sides of an axle. It is possible to carry out the braking operation on all the axles and only on specific axles of the vehicle. Since the front axle is particularly exposed to water spray and splashes of water and, as a rule, at least in passenger cars, a large part of the braking effect is achieved on the front axle, the front axle will, as a rule, be included in the method. If the method is carried out on a plurality of axles, this can take place independently of one another. Thus, higher time-threshold values $S_T$ can be provided for brakes of protected axles (rear axles) than for brakes of axles (front axles) more exposed to the wet conditions.

It is also within the scope of the present invention, during the braking operation, to control the engine power so that the running resistance increased by the actuation of the brakes during the braking operation is compensated by an engine-power output. This can be implemented within the framework of a conventional engine control which, depending on the operating state of the drive unit, can exert a corresponding influence on regulating variables, such as throttle-flap position, injected fuel quantity. The regulation, which is carried out according to Step 114, is performed by a subordinate controller.

In Steps 115 to 117, a check is made as to whether a criterion for terminating the braking operation is satisfied. According to Step 115, a check is made as to whether the time T2 has exceeded the action time $T_E$. A check is made in Step 116 as to whether a regulation of the brake pressure by the anti-lock system is carried out. If one of these two criteria is satisfied, there is a jump to Step 118, where the braking operation is terminated and the generated brake pressure is reduced. Without carrying out Step 118, the braking operation is terminated according to Step 117 when it is detected via the signal "BLS" of the stop-light switch that the driver is actuating the brake. After Step 117 or Step 118, there is a jump back to Step 101. If none of the termination criteria are satisfied, then there is a jump back to Step 114 and the braking operation is pursued.

Figure 2:
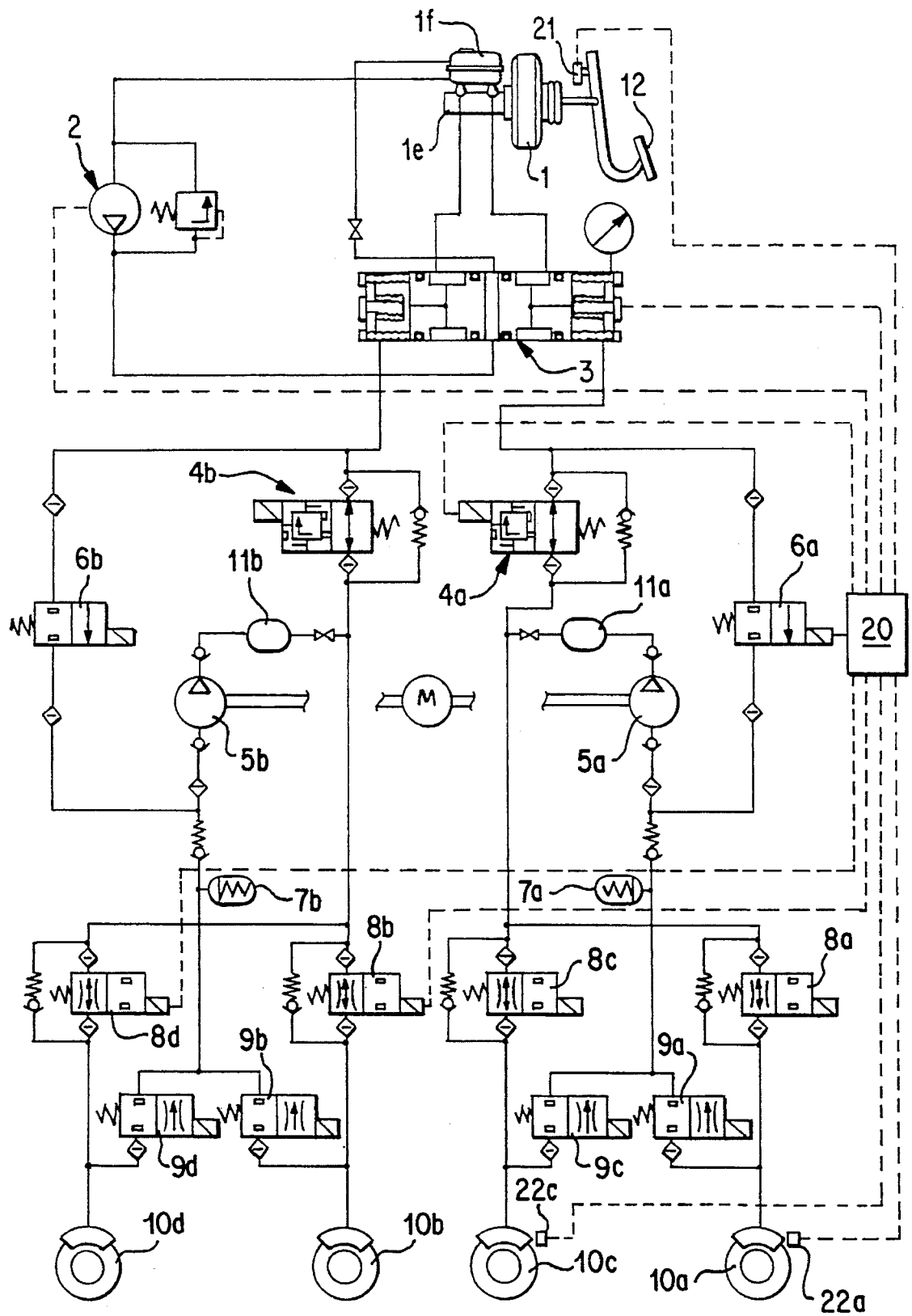
FIG. 2 is a schematic view of a brake system suitable for carrying out the method.

FIG. 2 shows a brake system which is suitable for carrying out the above-described method and which very much resembles a current vehicle dual-circuit brake system, with one brake circuit supplying the wheel brakes 10a, 10c of the front axle and the other brake circuit supplying the wheel brakes 10b, 10d of the rear axle. Electrical control lines are shown only insofar as they serve for carrying out the method according to the present invention and are represented by broken lines in order to distinguish them from hydraulic lines. The control unit 20 controlling the carrying out of the method records brake actuations ("BLS"=0.1) via the stop-light switch 21. If the brake temperature TB is taken into account, the temperature can be recorded, for example, via the sensors 22a, 22c of the wheel brakes 10a, 10c on the front axle. All the components assigned to the front-axle brake circuit are identified by the letters a and c after the reference symbols corresponding to the component, and the letters b and d identify the arrangement in the rear-axle brake circuit.

When the brake pedal 12 is actuated, the brake force is boosted in the brake booster 1 via the pressure difference between the chambers. The brake pressure is generated in the brake master cylinder 1e. Furthermore, the charge-piston unit 3 allows brake pressure to be generated for each of the two brake circuits separately from one another, without the brake pedal being actuated. The charge-piston unit 3 is supplied with brake fluid from the brake-fluid reservoir 1f by the precharging pump 2.

In the brake master cylinder 1e, the brake circuits are divided between the front axle and rear axle. In normal brake actuation without the action of a brake-pressure control, the brake pressure is generated in the brake master cylinder and is introduced through the charge-piston unit 3 and via the opened change-over valves 4a, 4b and through inlet valves 8a, 8c, 8b, 8d into the wheel brakes 10a, 10b, 10c, 10.

The change-over valves 4a, 4b allow a regulated supply of the brake circuits with a brake pressure. The precharging valves 6a, 6b are then actuated and consequently opened when brake fluid is additionally to be fed to the return pumps 5a, 5b respectively by the precharging pump 2 and the charge-piston unit 3, although the change-over valves 4a, 4b respectively shut off.

For regulating the brake pressure, each of the wheel brakes 10a, 10c, 10b, 10d is assigned a respective inlet valve 8a, 8c, 8b, 8d and a respective outlet valve 9a, 9c, 9b, 9d. In the rest position, the inlet valves 8a, 8c, 8b, 8d are opened, and the outlet valves 9a, 9c, 9b, 9d are closed. For a rapid brake-pressure reduction and for a renewed brake-pressure build-up, for example during a regulating action by an anti-lock system, each brake circuit has a return pump 5a and 5b. On the suction side, the return pump 5a and 5b is connected to the outlet valves 9a, 9c and 9b, 9d of the corresponding brake circuit and to the corresponding precharging valves 6a, 6b. For the compensation of pressure fluctuations, a spring accumulator 7a, 7b is arranged upstream of each return pump 5a, 5b and a compensating tank 11a, 11b is arranged downstream of each return pump.

When the control 20 detects that a brake pressure is to be generated by the method according to the present invention, the precharging valve 6a on the front axle is opened and the change-over valve 4a is shut off. As a result of the opening of only the precharging valve 6a, the braking operation remains limited to the front axle. The return pump 5a is then fed with brake fluid by the precharging pump 2 via the charge-piston unit 3. The charge-piston unit 3 remains inoperative because the brake pressure which can be generated by the precharging pump 2 and return pump 5a is sufficient for carrying out the method according to the invention.

The return pump 5a conveys brake fluid to the wheel brakes 10a, 10c via the respective opened inlet valves 8a, 8c and generates brake pressure. As soon as sufficient brake pressure has been generated, the precharging valve 6a is shut off again. The brake pressure can be measured by direct measurement. It can also be computed from the conveying rate of the precharging pump 2 and of the return pump 5a, so that the generated brake pressure is known from the time when the precharging valve 6a is opened. To reduce the brake pressure, it is sufficient to open the change-over valve 4a again.

According to another embodiment, the braking operation can also be carried out by generating pressure in the charge-piston unit 3. That is, the charge-piston unit 3 is supplied with brake fluid by the precharging pump 2, and the brake pressure is generated in the charge-piston unit 3. For example, a pair of plungers can be used as a charge-piston unit 3. To prevent braking of the rear axle, the inlet valves 8b, 8d are closed. This procedure is advantageous particularly in the case of diagonal brake circuits because the division between the front-axle brakes 10a, 10c and rear-axle brakes 10b, 10d is thereby simpler. When the braking operation is terminated, the brake fluid flows back into the brake-fluid reservoir 1f via the charge-piston unit 3 which is no longer in operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for ensuring in a vehicle utilizing a control unit a braking effect of vehicle brakes under wet conditions, comprising the steps of (a) determining a presence of wet conditions via a sensor device;

(b) recording a time free of brake actuation when the wet conditions are present;

(c) carrying out a braking operation during an action time at least when the recorded time free of brake actuation exceeds a time-threshold value; and (d) generating a brake pressure during the braking operation such that the braking effect is determined so to achieve a vehicle deceleration undetectable by a driver.

2. The method according to claim 1, wherein the step of determining includes monitoring a switching position of a screen-wiper switch via the sensor device which is configured to conclude that wet conditions are present when the switching position of the screen-wiper switch corresponds to an actuation of an associated screen wiper.

3. The method according to claim 2, wherein the time-threshold value is determined in dependence on the actuation of the screen wiper so that the time-threshold value is decreased with an increase in wiping frequency.

4. The method according to claim 1, wherein an actuation of the brake pedal by the driver is evaluated as a brake actuation.

5. The method according to claim 1, wherein the brake pressure for the braking operation is generated by brake fluid coming from an associated pressure reservoir.

6. The method according to claim 5, wherein an existing pressure reservoir of a regulator comprising one of an anti-lock control and a drive-slip control acting via the vehicle brakes, is the pressure reservoir.

7. The method according to claim 1, wherein, during the braking operation, a pressure difference between the chambers of a brake booster is generated, independently of arbitrary driver brake actuation, and the brake pressure is generated in a brake master cylinder resulting from pressure differential acting on at least one wheel brake.

8. The method according to claim 7, wherein, during the braking operation, selected ones of main brake lines are interrupted by shut-off valves, so that brake pressure is generated only in wheel-brake cylinders connected to uninterrupted main brake lines.

9. The method according to claim 1, wherein a brake pressure of between 3 and 10 bar is generated.

10. The method according to claim 5, wherein a brake pressure of between 3 and 5 bar is generated.

11. The method according to claim 7, wherein a brake pressure of between 3 and 5 bar is generated.

12. The method according to claim 1, wherein vehicle deceleration is determined and, during the braking operation, the generated brake pressure is regulated so that the vehicle deceleration does not exceed a specific predetermined value.

13. The method according to claim 12, wherein the predetermined specific value of the vehicle deceleration is between 0.03 g and 0.05 g.

14. The method according to claim 1, wherein the braking operation is terminated with one of the elapse of the action time and arbitrary actuation of the brake pedal by the driver before lapse of the action time.

15. The method according to claim 14, wherein the action time is between 10 and 30 seconds.

16. The method according to claim 15, wherein the action time is determined in dependence on actuation of a vehicle screen wiper so that the action time increases with an increase in wiping frequency of the vehicle screen wiper.

17. The method according to claim 1, wherein the braking operation is terminated when an anti-lock system detects that a wheel loaded with brake pressure during the braking operation reaches a locking limit, thereby indicating occurrence of a regulation of the brake pressure by the anti-lock system.

18. The method according to claim 1, wherein, for a duration of an action time, the braking operation can be triggered via an operating element actuatable by the driver independent of other criteria.

19. The method according to claim 1, wherein, during the braking operation, substantially identical brake pressure is generated on both sides of a vehicle axle.

20. The method according to claim 19, wherein the braking operation is carried out simultaneously on each vehicle axle.

21. The method according to claim 19, wherein the braking operation is carried out independently on each vehicle axle.

22. The method according to claim 19, wherein the braking operation is carried out on selected vehicle axles.

23. The method according to claim 22, wherein the braking operation is carried out only on a front axle.

24. The method according to claim 1, wherein in that at least one variable influencing instantaneous drive power of an associated drive unit is determined for a duration of the braking operation so that, in addition to drive power to be applied instantaneously, an additional drive power compensating the brake actuation is generated.

25. The method according to claim 1, wherein brake temperature is recorded, and the braking operation is carried out only when the brake temperature is lower than a temperature-threshold value.

26. The method according to claim 1, wherein, instead of the time free of brake actuation and the exceeding of the time-threshold value, a brake temperature is recorded and a falling below a temperature-threshold value is a criterion for carrying out the braking operation.

27. The method according to claim 25, wherein the temperature-threshold value is in the range of the boiling point of water.

28. The method according to claim 26, wherein the temperature-threshold value is between 60° C. and the boiling point of water.

29. The method according to claim 1, wherein the braking operation is carried out only when, with the time-threshold value exceeded, a vehicle speed is higher than a speed-threshold value.

30. The method according to claim 29, wherein the speed-threshold value is between about 80 and 100 km/h.

31. The method according to claim 1, wherein the time-threshold value is between about 2 and 10 minutes.

32. The method according to claim 31, wherein the time-threshold value is determined in dependence on the vehicle speed.

33. A system for ensuring a braking effect of vehicle brakes during wet conditions, comprising at least one brake circuit for supplying wheel brakes of wheel brakes of ones of the associated axle;

a sensor device for detecting presence of wet conditions in selected wheel brakes;

a control unit associated with the at least one brake circuit, including means for recording a time free of brake actuation when the wet conditions are present and issuing a control signal for carrying out a braking operation during an action time at least when the recorded time exceeds a time-threshold value;

wherein the at least one brake circuit is configured to generate a brake pressure during the braking operation such that vehicle deceleration is undetectable by vehicle occupants.

* * * * *